US012022810B2

(12) United States Patent
Welikala

(10) Patent No.: US 12,022,810 B2
(45) Date of Patent: Jul. 2, 2024

(54) ELECTRICALLY HEATED HONEYCOMB CUTTER

(71) Applicant: Anura Welikala, Simi Valley, CA (US)

(72) Inventor: Anura Welikala, Simi Valley, CA (US)

( * ) Notice: Subject to any disclaimer, the term of this patent is extended or adjusted under 35 U.S.C. 154(b) by 29 days.

(21) Appl. No.: 17/981,786

(22) Filed: Nov. 7, 2022

(65) Prior Publication Data

US 2023/0165226 A1    Jun. 1, 2023

Related U.S. Application Data

(60) Provisional application No. 63/284,623, filed on Nov. 30, 2021.

(51) Int. Cl.
*A01K 59/00*    (2006.01)
(52) U.S. Cl.
CPC .................... *A01K 59/00* (2013.01)
(58) Field of Classification Search
CPC ........ A01K 59/00; A01K 59/02; A01K 59/06; B26D 7/08; B26D 7/10; B26F 3/12; B26F 3/06; B26F 3/08
USPC .......... 449/55, 61, 51, 54, 63; 30/140; 83/15
See application file for complete search history.

(56) References Cited

U.S. PATENT DOCUMENTS

| | | | | |
|---|---|---|---|---|
| 127,187 A * | 5/1872 | Peabody | ................ | A01K 59/02 30/140 |
| 883,343 A * | 3/1908 | Porter | ................ | A01K 59/02 165/142 |
| 1,104,053 A * | 7/1914 | Lea | ................ | A01K 59/02 165/169 |
| 1,584,392 A * | 5/1926 | Markle | ................ | A01K 59/02 126/226 |
| 1,785,078 A * | 12/1930 | Gibson | ................ | F25C 5/00 62/320 |
| 2,013,234 A * | 9/1935 | Dewey | ................ | B29D 30/68 30/280 |
| 2,016,523 A * | 10/1935 | Stringer | ................ | A01K 59/02 30/140 |
| 2,027,993 A * | 1/1936 | Methven | ................ | F25C 5/08 62/320 |
| 2,062,998 A * | 12/1936 | Peterson | ................ | B44D 3/168 15/236.01 |
| 2,097,639 A * | 11/1937 | Perreton | ................ | A01K 59/00 83/167 |
| 2,097,811 A * | 11/1937 | Foley | ................ | B29D 30/68 219/230 |
| 2,108,754 A * | 2/1938 | Ludke | ................ | A01K 59/02 30/140 |
| 2,140,478 A * | 12/1938 | Mossback | ................ | B29D 30/68 30/140 |
| 2,168,579 A * | 8/1939 | Perreton | ................ | A01K 59/00 53/514 |
| 2,234,129 A * | 3/1941 | Pfeil | ................ | F25C 5/043 62/320 |

(Continued)

*Primary Examiner* — Timothy D Collins
*Assistant Examiner* — Maria E Graber
(74) *Attorney, Agent, or Firm* — Barry Choobin; Patent 360

(57) ABSTRACT

A honeycomb cutter has a cutting block that is of a mold shape that can cut honeycomb into honeycomb pieces of desired shape and size. The cutting block can be heated wherein the hot and sharp cutting block can easily cut through the honeycomb. The honeycomb cutter has a heating block for heating the cutting block.

7 Claims, 4 Drawing Sheets

(56) References Cited

U.S. PATENT DOCUMENTS

| | | | | |
|---|---|---|---|---|
| 2,250,602 A * | 7/1941 | Pierce | B26B 3/00 | 219/229 |
| 2,662,962 A * | 12/1953 | Green | B44D 3/168 | 248/688 |
| 2,701,835 A * | 2/1955 | Anton | H05B 3/02 | 30/140 |
| 2,896,059 A * | 7/1959 | Ruff | B29D 30/68 | 219/233 |
| 2,960,592 A * | 11/1960 | Pierce | A01K 59/02 | 30/140 |
| 2,972,035 A * | 2/1961 | Miller | B29C 37/02 | 30/140 |
| 3,673,383 A * | 6/1972 | Sofia | B26B 5/00 | 30/169 |
| 4,000,395 A * | 12/1976 | Fischer | B26F 3/06 | 83/171 |
| 4,481,057 A * | 11/1984 | Beard | B26B 7/00 | 219/229 |
| 4,776,051 A * | 10/1988 | Syme | A01K 59/04 | 210/361 |
| 4,986,875 A * | 1/1991 | Hamlin, Jr. | B29C 65/305 | 156/763 |
| 5,064,994 A * | 11/1991 | Urban | B26D 7/10 | 219/229 |
| 5,073,696 A * | 12/1991 | Patillo | A61C 13/0028 | 219/229 |
| 6,230,603 B1 * | 5/2001 | Kubala | B26D 7/10 | 83/171 |
| 6,711,821 B1 * | 3/2004 | Clarke | B26D 7/10 | 30/140 |
| 8,650,760 B2 * | 2/2014 | Van Alstine | B23D 35/008 | 30/294 |
| 2003/0159220 A1 * | 8/2003 | Trbovich, Jr. | B26B 11/008 | 30/140 |
| 2007/0067998 A1 * | 3/2007 | Bendixen | A23G 9/285 | 30/140 |
| 2009/0197507 A1 * | 8/2009 | Arndt | A01K 51/00 | 449/2 |

* cited by examiner

ELECTRICALLY HEATED HONEYCOMB CUTTER

CROSS-REFERENCE TO RELATED APPLICATIONS

This application claims priority from a U.S. Provisional Patent Appl. No. 63/284,623 filed on Nov. 30, 2021, which is incorporated herein by reference in its entirety.

FIELD OF INVENTION

The present invention relates to a cutter for a honeycomb, and more particularly, the present invention relates to an electrically heated honeycomb cutter.

BACKGROUND

Processing of honey from honeycombs exposes the honey to harsh conditions that are detrimental to certain ingredients of the raw honey and negatively impact the overall quality of the honey. For example, the beneficial pollens get filtered or damaged by exposure to heat and heavy processing. Due to these reasons, the demand for unprocessed and unadulterated honey is rising in the market. People prefer to buy raw honeycomb rather than processed honey. Currently, to serve this rising market segment, beekeepers cut either 2×4 inch or 4×4 inch raw honeycomb pieces that includes honey. These pieces are then packed in suitable containers for transportation and storage.

Presently, the cutting of the honeycomb is done using a sharp knife. However, cutting with a knife is a tedious and slow process because the honeycomb must first be manually marked to the right size before cutting. Also, are available, mechanical honeycomb cutters, such as honeycomb cutters in a square or rectangular shape. These manual honeycomb cutters have an advantage over knife cutting by eliminating the need for manually measuring and marking the honeycomb for cutting. However, the known honeycomb cutter also suffers from several drawbacks. By nature, honey and wax is very sticky that stick to any surface. The biggest challenge is due to the nature of honey and wax both current processes are very slow. Also, due to the force required to cut through cold wax, repeated cutting makes it very tiring. A need is therefore appreciated for a novel honeycomb cutter that is devoid of the aforesaid drawbacks.

SUMMARY OF THE INVENTION

The following presents a simplified summary of one or more embodiments of the present invention to provide a basic understanding of such embodiments. This summary is not an extensive overview of all contemplated embodiments and is intended to neither identify critical elements of all embodiments nor delineate the scope of any or all embodiments. Its sole purpose is to present some concepts of one or more embodiments in a simplified form as a prelude to the more detailed description that is presented later.

The principal object of the present invention is therefore directed to a honeycomb cutter in which the force required to cut through the waxy honeycomb is significantly reduced.

It is another object of the present invention that the honey within the hexagonal cells of the honeycomb is not exposed to heat while cutting.

It is still another object of the present invention that the honeycomb cutter can significantly reduce labor and fatigue.

It is a further object of the present invention that the process of cutting honeycomb in desired shapes and sizes becomes more efficient.

It is yet another object of the present invention that the honeycomb cutter is economical to manufacture.

In one aspect, disclosed is a honeycomb cutter for cutting honeycomb into honeycomb pieces of desired shape and sizes, the honeycomb cutter comprises a cutting block that is hollow with surrounding thin walls and open bottom, the thin walls have sharp edges, a shape and size of the cutting block corresponds to a shape and size of the honeycomb pieces; a heating block, wherein the cutting block is interchangeably coupled to the heating block, the heating block is configured to heat the thin walls; a handle spatially positioned above the heating block; and a U-shape rigid tube configured to support the handle, the U-shape rigid tube extends between the handle and the heating block. The honeycomb cutter further comprises a tunnel that passes through the U-shape rigid tube and the handle, one end of the tunnel opens in the heating block and another end of the tunnel opens at a free end of the handle; and a wire connecting the heating block to a power supply, wherein the wire from the heating block passes through the tunnel and exits from the free end of the handle. The honeycomb cutter further comprises a heat shield spatially positioned between the handle and the heating block. The cutting block has an outer protective layer of anti-corrosion material. The U-shape rigid tube is made of stainless steel.

BRIEF DESCRIPTION OF THE DRAWINGS

The accompanying figures, which are incorporated herein, form part of the specification and illustrate embodiments of the present invention. Together with the description, the figures further explain the principles of the present invention and enable a person skilled in the relevant arts to make and use the invention.

DETAILED DESCRIPTION

Figure 1:
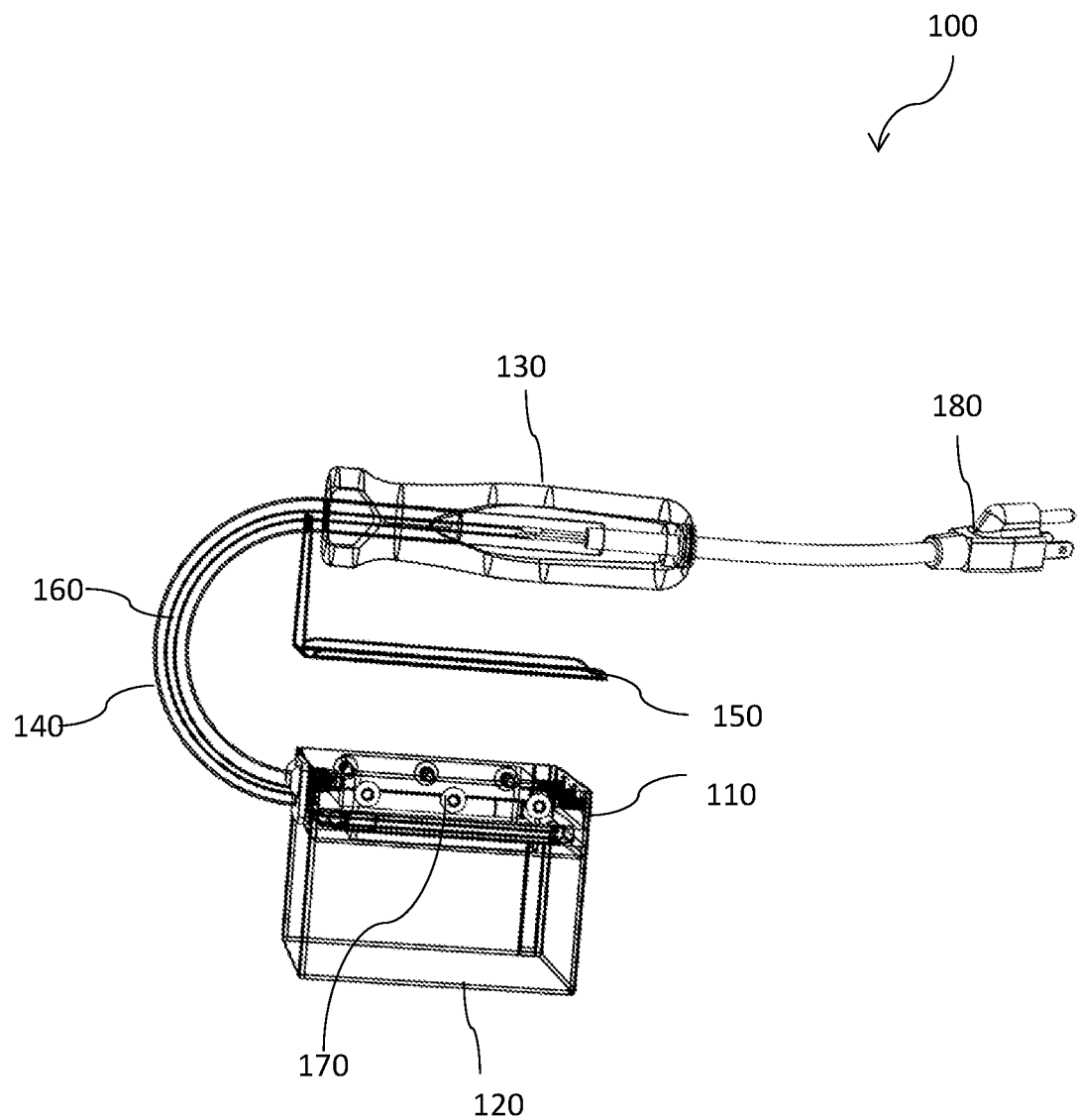
FIG. 1 is a perspective view of the honeycomb cutter, according to an exemplary embodiment of the present invention.

Subject matter will now be described more fully hereinafter. Subject matter may, however, be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, the subject matter may be embodied as apparatus and methods of use thereof. The following detailed description is, therefore, not intended to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the term "embodiments of the present invention" does not require that all embodiments of the invention include the discussed feature, advantage, or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

The following detailed description includes the best currently contemplated mode or modes of carrying out exemplary embodiments of the invention. The description is not to be taken in a limiting sense but is made merely for the purpose of illustrating the general principles of the invention since the scope of the invention will be best defined by the allowed claims of any resulting patent.

The following detailed description is described with reference to the drawings, wherein like reference numerals are used to refer to like elements throughout. In the following description, for purposes of explanation, specific details may be set forth in order to provide a thorough understanding of the subject innovation. It may be evident, however, that the claimed subject matter may be practiced without these specific details. In other instances, well-known structures and apparatus are shown in block diagram form in order to facilitate describing the subject innovation. Moreover, the drawings may not be to scale.

Disclosed is a honeycomb cutter in which the cut-through blade can be heated to reduce the force required for cutting the honeycomb into pieces. The blades of the disclosed honeycomb cutter can be heated to a temperature above the melting point of wax in the honeycomb, thus the blade can easily cut through the honeycomb reducing labor and fatigue. The processing speed may also increase thus enhancing the overall efficiency of the process. Since significantly less force has to be applied to cut the honeycomb, fatigue is less. There is no need to manually mark up the sizes and shapes. Perhaps, the disclosed device can be adapted for different sizes and shapes.

In one implementation, the disclosed honeycomb cutter includes an aluminum heating block for uniform heating of the blade. The blade can be in the form of a mold of desired shape and size, wherein the heated blade can easily cut through the honeycomb resulting in honeycomb pieces of desired shape and size. In one case, the blade can be interchangeably coupled to the heating block. Thus, the blade, also referred to herein as a cutting block or a blade block, of different shapes and sizes can be interchangeably used with a common heating block. The heater can be further powder coated to prevent any oxidation.

In one implementation, cartridge heaters can be used to provide higher-density heat in a small heating block. A handle made from heat-insulative material can also be provided to hold and maneuver the disclosed honeycomb cutter, for example, a wooden handle can be incorporated. Preferably, the size of the handle can be large for convenient handling. The handle can be mounted right above the cutting edge to provide ease of application of vertical force to the cutting surface. A heat shield can also be provided between the handle and the cutting block to prevent any accidental contact with the heated cutting block as well as to shield any hot flashes on hand from the heated cutting block.

The cutting block/blade block can be made from any material that can be heated above 150-degree Fahrenheit and can have sharper edges for cutting through the wax honeycomb. Preferably, copper can be used for better heat conductivity. The sharpened cutting edges of the bade reduce cut-through force. The blade block can further be provided with a coating to prevent any corrosion. For example, an electroless nickel-plated blade to increase the copper substrate's corrosion resistance and operating temperature can be implemented. The handle can be connected to the heating block through rigid tubes, such as a U-shape tube. The tube can also be made from durable and corrosion-resistant materials, such as stainless steel. The heating block can be powered by an external power supply for which suitable electrical wires can be provided for connecting the heating block to a power interface. Such wires can pass through the rigid tube and handle and protrude through a free end of the handle. This may keep the wires away from the blade block and keeps the arrangement of the wires tidy. Such an arrangement of the power cord can also make handling the device easier. Also, a suitable metal wire retention ring can be used around the power cord to prevent to power cord from getting pulled out from the heating block. The handle can be immobilized to prevent any rotation of the handle while operating the honeycomb cutter. For example, a blind rivet prevents handle rotation from the handle tube. Rubber seals can be used around the power cord and the handle to prevent any moisture from getting inside the handle.

Figure 2:
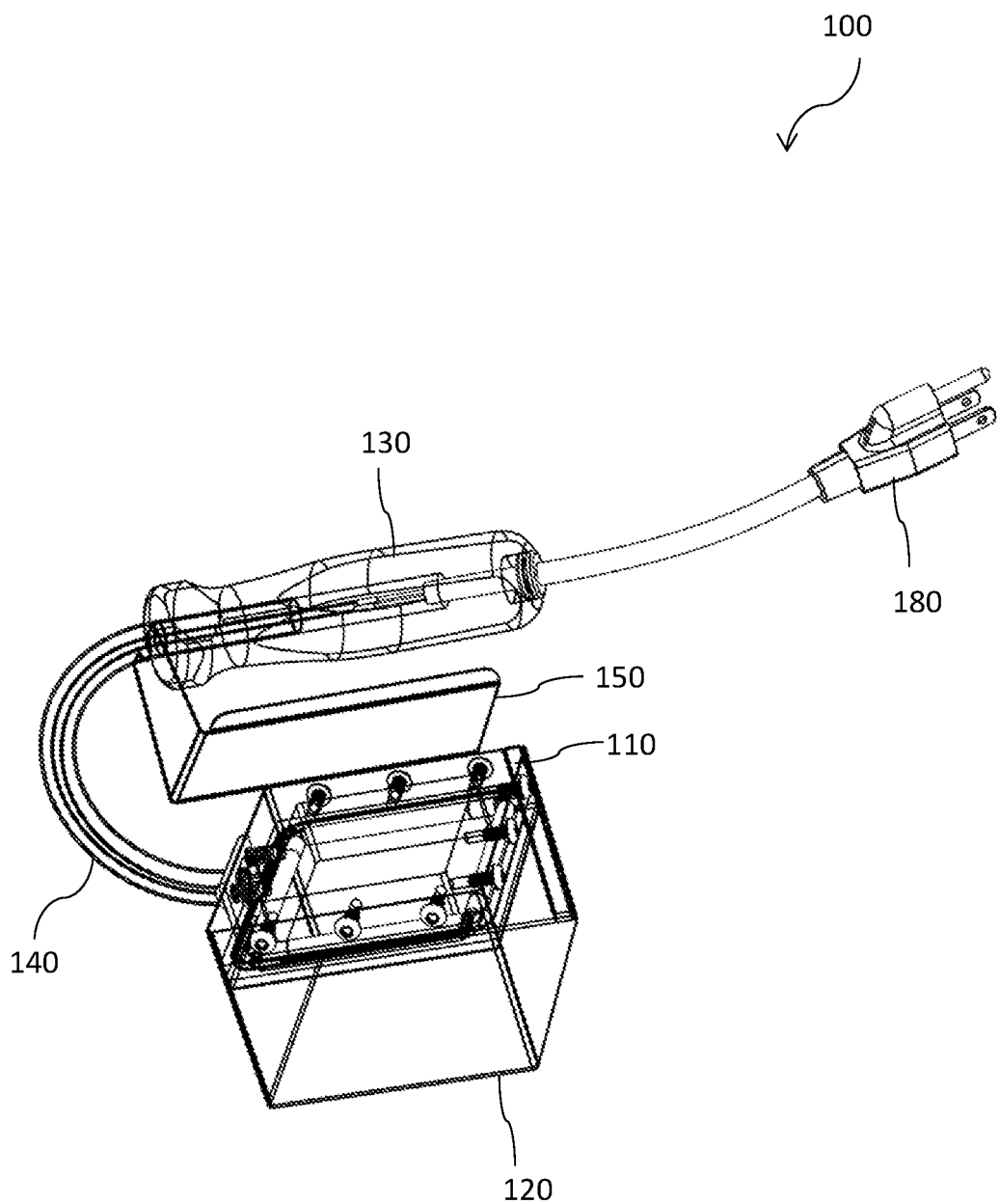
FIG. 2 shows another view of the honeycomb cutter, according to an exemplary embodiment of the present invention.
Figure 3:
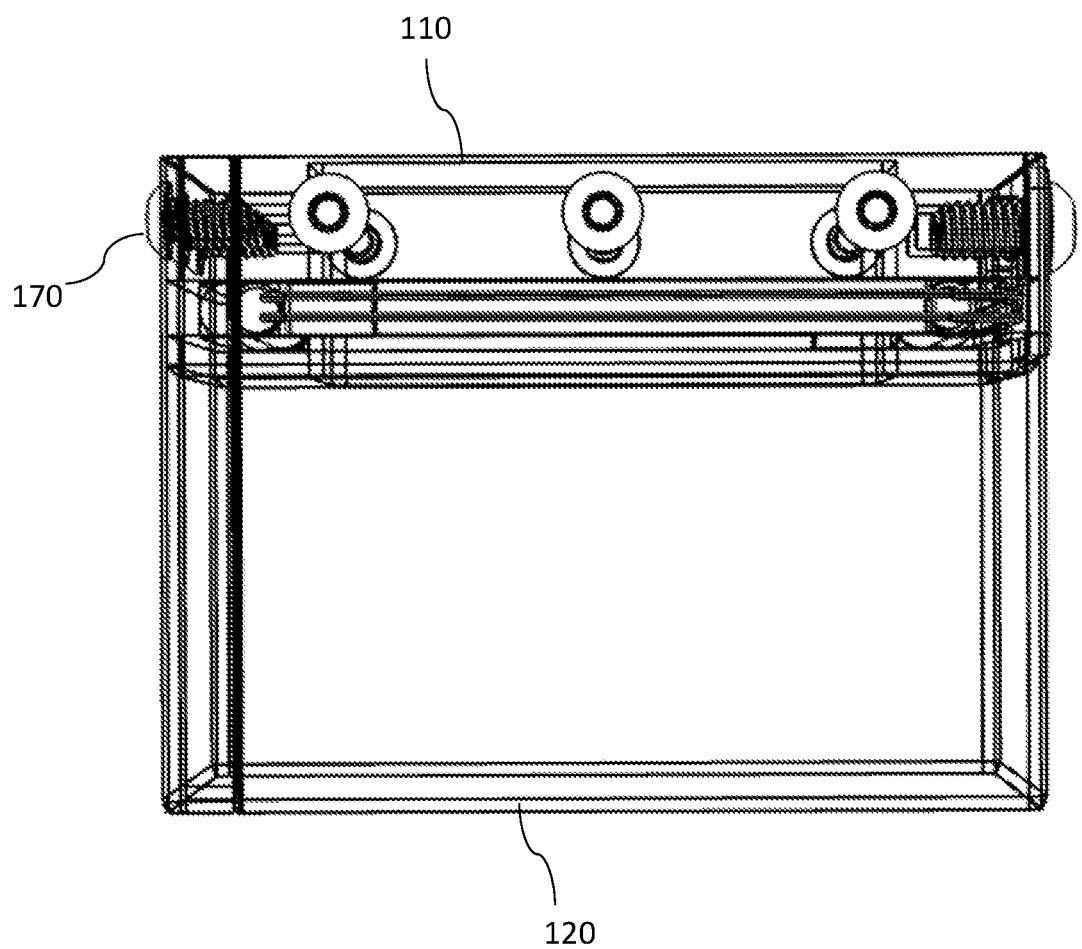
FIG. 3 shows the heating block and the cutting block/blade block, according to an exemplary embodiment of the present invention.
Figure 4:
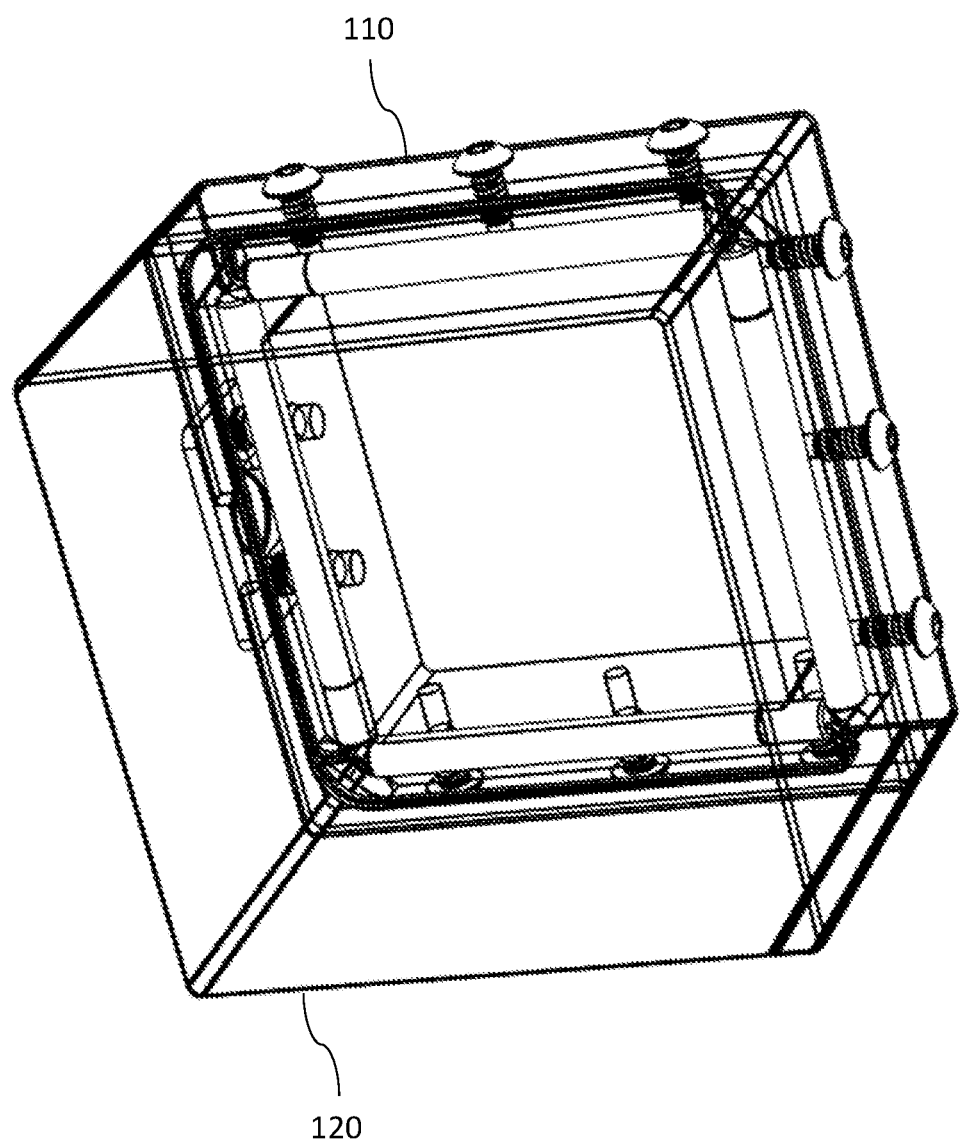
FIG. 4 shows another view of the heating block and the cutting block, according to an exemplary embodiment of the present invention.

Referring to FIGS. 1-4 which show an exemplary embodiment of the disclosed honeycomb cutter 100. The honeycomb cutter can include a heating block 110 that incorporates suitable heaters to heat the blade block/cutting block/blade 120. The heaters can be powered through an external power supply. Any suitable heater, such as cartridge heaters or ceramic heaters can be employed without departing from the scope of the present invention. The blade block 120 can be coupled to the heating block and can be heated. The drawings show the blade block as a square shape, however, the shape and size of the blade block can be varied depending on the desired shape and size of the cut honeycomb pieces. The blade block can have sharp edges and thin walls which can be heated, and the sharp edge, thin, and hot walls easily cut through the honeycomb. More clearly shown in FIGS. 3 and 4, the blade block can be coupled to the heating block using a suitable fastening mechanism, such as the screws 170 shown in the drawings. A handle 130 is also shown in FIGS. 1 and 2, the handle is spatially positioned above the heating block. The handle can be ergonomically designed so that it can be grabbed in a hand and the disclosed honeycomb cutter can be pushed into the honeycomb for cutting. The handle can be coupled to the heating block using a U-shape tube 140. The U-shape tube can be made from a rigid and durable material that maintains shape and withstands the force on the handle. A heat shield 150 is also shown positioned between the handle and the heating block. Tube 140 and handle 130 can be hollow to form a continuous tunnel that at one end opens in the heating block and the other end of the tunnel opens at a free end of the handle. A wire 160 from the heating block can pass through this tunnel and exit from the handle as shown in FIGS. 1 and 2. A plug 180 can be provided at end of the wire for connecting to a power supply interface, such as a wall switch.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention as claimed.

What is claimed is:

1. A honeycomb cutter for cutting honeycomb into honeycomb pieces of desired shape and sizes, the honeycomb cutter comprises:
   a cutting block that is hollow with surrounding thin walls and an open bottom, the thin walls have sharp edges, a shape and size of the cutting block corresponds to a shape and size of the honeycomb pieces;
   a heating block, wherein the cutting block is interchangeably coupled to the heating block, the heating block is configured to heat the thin walls;
   a handle spatially positioned above the heating block; and
   a U-shape rigid tube extending between the handle and heating block, the U-shape rigid tube configured to support the handle above the heating block.

2. The honeycomb cutter of claim 1, wherein the honeycomb cutter further comprises:
   a tunnel that passes through the U-shape rigid tube and the handle, one end of the tunnel opens in the heating block and another end of the tunnel opens at a free end of the handle; and
   a wire connecting the heating block to a power supply, wherein the wire from the heating block passes through the tunnel and exits from the free end of the handle.

3. The honeycomb cutter of claim 1, wherein the cutting block is square.

4. The honeycomb cutter of claim 1, wherein the U-shape rigid tube is made of stainless steel.

5. The honeycomb cutter of claim 1, wherein the cutting block is made of copper.

6. The honeycomb cutter of claim 5, wherein the cutting block has an outer protective layer of anti-corrosion material.

7. A honeycomb cutter for cutting honeycomb into honeycomb pieces of desired shape and sizes, the honeycomb cutter comprises:
   a cutting block that is hollow with surrounding thin walls and an open bottom, the thin walls have sharp edges, a shape and size of the cutting block corresponds to a shape and size of the honeycomb pieces;
   a heating block, wherein the cutting block is interchangeably coupled to the heating block, the heating block is configured to heat the thin walls;
   a handle spatially positioned above the heating block;
   a U-shape rigid tube configured to support the handle, the U-shape rigid tube extends between the handle and the heating block; and
   a heat shield spatially positioned between the handle and the heating block.

* * * * *